(12) United States Patent
Ingalls et al.

(10) Patent No.: US 7,331,589 B2
(45) Date of Patent: Feb. 19, 2008

(54) DUAL AXIS BUSHING ASSEMBLY AND METHOD FOR CAMBER AND CASTER ADJUSTMENT

(75) Inventors: William E. Ingalls, Atascadero, CA (US); John W. Ryshavy, Wayzata, MN (US); James R. Ryshavy, Eden Prairie, MN (US)

(73) Assignee: Stempf Automotive Industries, Inc., Minnetonka, MN (US)

( * ) Notice: Subject to any disclaimer, the term of this patent is extended or adjusted under 35 U.S.C. 154(b) by 0 days.

(21) Appl. No.: 11/688,291

(22) Filed: Mar. 20, 2007

(65) Prior Publication Data

US 2007/0152417 A1 Jul. 5, 2007

Related U.S. Application Data

(62) Division of application No. 10/930,632, filed on Aug. 31, 2004, now Pat. No. 7,210,693.

(60) Provisional application No. 60/580,231, filed on Jun. 16, 2004.

(51) Int. Cl.
*B62D 17/00* (2006.01)

(52) U.S. Cl. ................................. 280/86.756

(58) Field of Classification Search ...............................
280/86.754–86.756, 86.75, 86.751, 93.512;
33/600, 612, 203.8, 193, 203.18
See application file for complete search history.

(56) References Cited

U.S. PATENT DOCUMENTS

| 2,605,118 | A | * | 7/1952 | Booth et al. | ........... | 280/86.756 |
|---|---|---|---|---|---|---|
| 2,890,893 | A | * | 6/1959 | Laukhuff | ............... | 280/86.756 |
| 3,072,423 | A | * | 1/1963 | Charlton | ...................... | 403/83 |
| 3,124,370 | A | * | 3/1964 | Traugott | ................ | 280/86.756 |
| 4,252,338 | A | * | 2/1981 | Ingalls et al. | .......... | 280/86.756 |
| 4,400,007 | A | * | 8/1983 | Ingalls | .................. | 280/86.756 |
| 4,420,272 | A | * | 12/1983 | Ingalls et al. | .................. | 403/4 |
| 4,577,534 | A | * | 3/1986 | Rayne | .......................... | 81/484 |
| 4,641,853 | A | * | 2/1987 | Specktor et al. | ....... | 280/86.756 |
| 4,753,454 | A | * | 6/1988 | Woehler | ................ | 280/86.755 |
| 4,754,991 | A | * | 7/1988 | Jordan | ................... | 280/86.756 |
| 4,795,187 | A | * | 1/1989 | Ingalls | .................. | 280/86.753 |
| 4,831,744 | A | * | 5/1989 | Specktor et al. | .............. | 33/600 |

(Continued)

*Primary Examiner*—Paul N. Dickson
*Assistant Examiner*—Drew J. Brown
(74) *Attorney, Agent, or Firm*—Haugen Law Firm PLLP (57) ABSTRACT

A dual axis bushing assembly for engagement between an axle arm and an upper ball joint of a vehicle. The dual axis bushing assembly includes an inner skewed bushing engaged in and rotatable in an outer skewed bushing. The dual axis bushing assembly includes a zero offset setting or a zero skewed setting where a skewed axis of the inner bushing is coaxial with a center axis of an outer cylindrical surface of the outer bushing. At the zero setting, a connector seating annular surface on the inner skewed bushing is disposed at a right angle relative to a cylindrical outer surface of the outer skewed bushing. In one embodiment, the connector seating annular surface is recessed in a head of the inner skewed bushing. In another embodiment, the connector seating annular surface is an outermost end surface of a head of the inner skewed bushing. A method of camber and caster adjustment is disclosed that eliminates each of the steps of installing a standard zero bushing, taking camber and caster readings with the standard zero bushing in place, and then removing the standard zero bushing for an after market bushing.

5 Claims, 10 Drawing Sheets

U.S. PATENT DOCUMENTS

| | | | |
|---|---|---|---|
| 4,970,801 A * | 11/1990 | Specktor et al. | 33/600 |
| 5,031,928 A * | 7/1991 | Tsubota et al. | 280/86.756 |
| 5,052,711 A * | 10/1991 | Pirkey et al. | 280/86.753 |
| 5,060,962 A * | 10/1991 | McWethy | 280/304.1 |
| 5,163,699 A * | 11/1992 | Specktor | 280/86.753 |
| 5,851,018 A * | 12/1998 | Curran et al. | 280/250.1 |
| 6,036,205 A * | 3/2000 | Schlosser et al. | 280/86.753 |
| 6,224,075 B1 * | 5/2001 | McIntyre | 280/86.751 |
| 6,485,223 B1 * | 11/2002 | Van Schmus et al. | 403/408.1 |
| 6,503,039 B2 * | 1/2003 | Ward | 411/427 |
| 2003/0011157 A1 * | 1/2003 | Aubarede et al. | 280/86.751 |

* cited by examiner

DUAL AXIS BUSHING ASSEMBLY AND METHOD FOR CAMBER AND CASTER ADJUSTMENT

CROSS-REFERENCE TO RELATED APPLICATIONS

This application is a divisional of U.S. patent application Ser. No. 10/930,632, filed on Aug. 31, 2004 now U.S. Pat. No. 7,210,693 and entitled "DUAL AXIS BUSHING ASSEMBLY AND METHOD FOR CAMBER AND CASTER ADJUSTMENT", which itself claims priority from U.S. Provisional Patent Application No. 60/580,231 filed Jun. 16, 2004, entitled "DUAL AXIS BUSHING ASSEMBLY", the contents of which are incorporated herein in their entirety.

FIELD OF THE INVENTION

The present invention relates generally to a bushing assembly having an outer bushing and an inner bushing engaged and rotatable relative to each other, particularly to such a rotatable bushing assembly where each of the bushings includes a skewed through opening, and specifically to such a rotatable and dual skewed bushing assembly installed between an axle arm and upper ball joint of a vehicle.

BACKGROUND OF THE INVENTION

A wheel is mounted on a spindle or steering knuckle. The spindle or steering knuckle includes support arms or extensions or portions for the reception of upper and lower ball joint assemblies. A ball joint is a ball and socket connection, and a ball stud extends from the ball portion of the ball joint.

An axle arm assembly, such as an I-beam axle arm assembly, includes a first or inner end anchored to the frame of the vehicle and a second or outer end supported by a coil spring and a radius arm. The second end is further engaged to the wheel by the upper and lower ball joint assemblies.

An upper portion of the second end of the axle arm assembly engages the stud of the ball of the upper ball joint. By manipulating the orientation of the upper portion of the second end of the axle arm relative to the stud of the ball of the ball joint, certain positions of the wheel relative to the frame of the vehicle may be adjusted. These certain positions are camber and caster.

Upper and lower steering pivot points, such as upper and lower ball joints, help define a caster angle. The upper and lower steering pivot points can be 1) the upper and lower ball joints of a wishbone suspension design, 2) the upper and lower ball joints of an A-arm suspension design, or 3) the lower ball joint and the strut tower mount of a McPherson strut design.

The caster or caster angle is the slope of a straight line running through the upper and lower steering pivot points relative to a vertical line running perpendicular to the ground and through the center point of the tire, when viewed from the side of the vehicle. Caster is a backward or forward tilt of a kingpin, ball joint, or strut at the top of the wheel assembly. A backward tilting is referred to as positive caster. A forward tilting is referred to as negative caster. Caster is a directional control angle or steering angle, not a tire wearing angle. Proper adjustment of the caster angle helps the front wheels maintain a straight ahead position or return to a straight ahead position out of a turn. Positive caster (a tilting back) places the point of load ahead of the wheel contact. Depending upon the vehicle, either positive or negative caster may be desired.

Camber is a tire-wearing angle. Camber, like caster, is a directional control angle. The camber or camber angle is the tilting of a front wheel relative to the vertical when viewed from the front of the vehicle. More specifically, camber is the inward or outward tilt of the wheel at the top relative to the ground or true vertical. Positive camber is the angle of the outward tilt relative to true vertical. Negative camber is the angle of the inward tilt relative to true vertical. By properly adjusting the camber angle, then 1) the road contact of the tire is brought more nearly under the point of load, and 2) easier steering is provided by allowing the weight of the vehicle to be carried by the inner wheel bearing and spindle.

One method of caster and camber adjustment includes the steps of removing the original or first bushing, temporarily installing a standard zero offset or second bushing, taking camber and caster readings with the temporary installed, standard zero offset or second bushing in place, removing the standard zero offset or second bushing, and then installing an after market or third bushing.

SUMMARY OF THE INVENTION

A feature of the present invention is the provision in a dual axis bushing assembly, of an inner skewed bushing engaged in and rotatable in an outer skewed bushing, of the inner and outer skewed bushings being rotatable relative to each other such that a skewed axis of the inner skewed bushing is coaxial with an axis of the outer skewed bushing and such that the skewed axis of the inner skewed bushing is at a geometric center axis of the dual axis bushing assembly as a whole.

Another feature of the present invention is the provision in a dual axis bushing assembly having an inner skewed bushing engaged in and rotatable in an outer skewed bushing, of the bushing assembly engaged between an axle arm and an upper ball joint of a vehicle.

Another feature of the present invention is the provision in a dual axis bushing assembly having an inner skewed bushing engaged in and rotatable in an outer skewed bushing, of the inner skewed bushing having a head that includes a connector seating annular surface recessed therein for seating, for example, a snap ring.

Another feature of the present invention is the provision in a dual axis bushing assembly having an inner skewed bushing engaged in and rotatable in an outer skewed bushing, of each of the inner and outer skewed bushings including a head, of the heads rotatably confronting each other, of each of the heads being tapered to have a relatively thick portion relative to an axis of the bushing assembly and a relatively thin portion relative to the axis of the bushing assembly, and of the head of the inner skewed bushing including an outermost end annular surface comprising a connector seating annular surface for seating, for example, a castle nut.

Another feature of the present invention is the provision in a dual axis bushing assembly having an inner skewed bushing engaged in and rotatable in an outer skewed bushing, of the inner skewed bushing having a connector seating annular surface, and of the outer skewed bushing having a cylindrical outer surface portion that can be disposed at a right angle to the connector seating annular surface when the inner and outer skewed bushings are rotated relative to each other.

Another feature of the present invention is the provision in a dual axis bushing assembly having an inner bushing engaged in and rotatable in an outer bushing, of the outer bushing being skewed such that a through opening in the outer bushing is skewed relative to an outer surface cylindrical portion of the outer bushing.

Another feature of the present invention is the provision in a dual axis bushing assembly having an inner bushing engaged in and rotatable in an outer bushing, of the outer bushing including inner and outer annular seats, and of the inner bushing including inner and outer annular seats for engaging the respective inner and outer annular seats of the outer bushing whereby a stepped engagement is provided between the outer and inner bushings to minimize entry of dirt and moisture therebetween and whereby a head of a relatively greater height can be provided to the inner bushing.

Another feature of the present invention is the provision in a method for camber and caster adjustment of a wheel, of removing an original bushing from an upper ball joint, of installing a dual axis bushing assembly on the upper ball joint, wherein the dual axis bushing assembly includes an inner skewed bushing engaged and rotatable in an outer skewed bushing, and wherein the dual axis bushing assembly includes a zero offset setting, of rotating the outer and inner skewed bushings relative to each other to the zero setting if not at the zero setting when the dual axis bushing assembly was installed, and of rotating the outer and inner skewed bushings relative to each other to obtain desired camber and caster settings such that the step of temporarily installing a standard zeroed bushing to take camber and caster readings is eliminated.

An advantage of the present invention is accurate camber and caster settings. The present dual axis bushing assembly includes a neutral or zero offset setting. The inclusion of such a feature permits the elimination of the step of temporarily installing a standard zeroed bushing, a step that in and of itself may disturb caster and camber readings because the suspension connection train between the frame of the vehicle and the wheel is broken by removing the standard zeroed bushing and installing the after market bushing.

Another advantage of the present invention is efficiency in the adjustment of camber and caster because one step, namely the step of temporarily installing a standard zeroed bushing, is eliminated.

Another advantage of the present invention is simplicity. With the present dual axis bushing assembly in place on a vehicle and having the zero setting, camber and caster settings can be measured. Such camber and caster settings are usually unique, even with identical vehicles just off the assembly line. Then, taking into account the unique camber and caster settings, the inner and outer skewed bushings are rotated relative to each other and/or the bushing assembly as a whole is rotated relative to the stud of the ball joint, such that the wheel takes on the desired camber and caster settings.

Another advantage of the present invention is cost. The dual axis bushing assembly having an outer skewed bushing and an inner skewed bushing is relatively inexpensive to manufacture. Further, the cost of stocking standard zeroed bushings for a number of different vehicles is eliminated.

Another advantage of the present invention is that the heads of the dual axis bushing assembly are user-friendly. That is, the inner and outer bushing assemblies are structured to provide heads that are relatively thick in the axial direction and relatively large in diameter. The thicker heads provide a greater surface area for reception of the tool of the technician to thereby minimize a slipping of the tool off the bushing assembly. The larger heads provide a greater leverage and thus easier turning for the technician. Features that contribute to the greater thickness and greater diameter are, in one embodiment, the provision of a stepped engagement between the inner and outer bushings and, in another embodiment, the provision of each of the inner and outer skewed bushings having tapered heads that rotatably confront each other.

DESCRIPTION OF THE PREFERRED EMBODIMENTS

Figure 1:
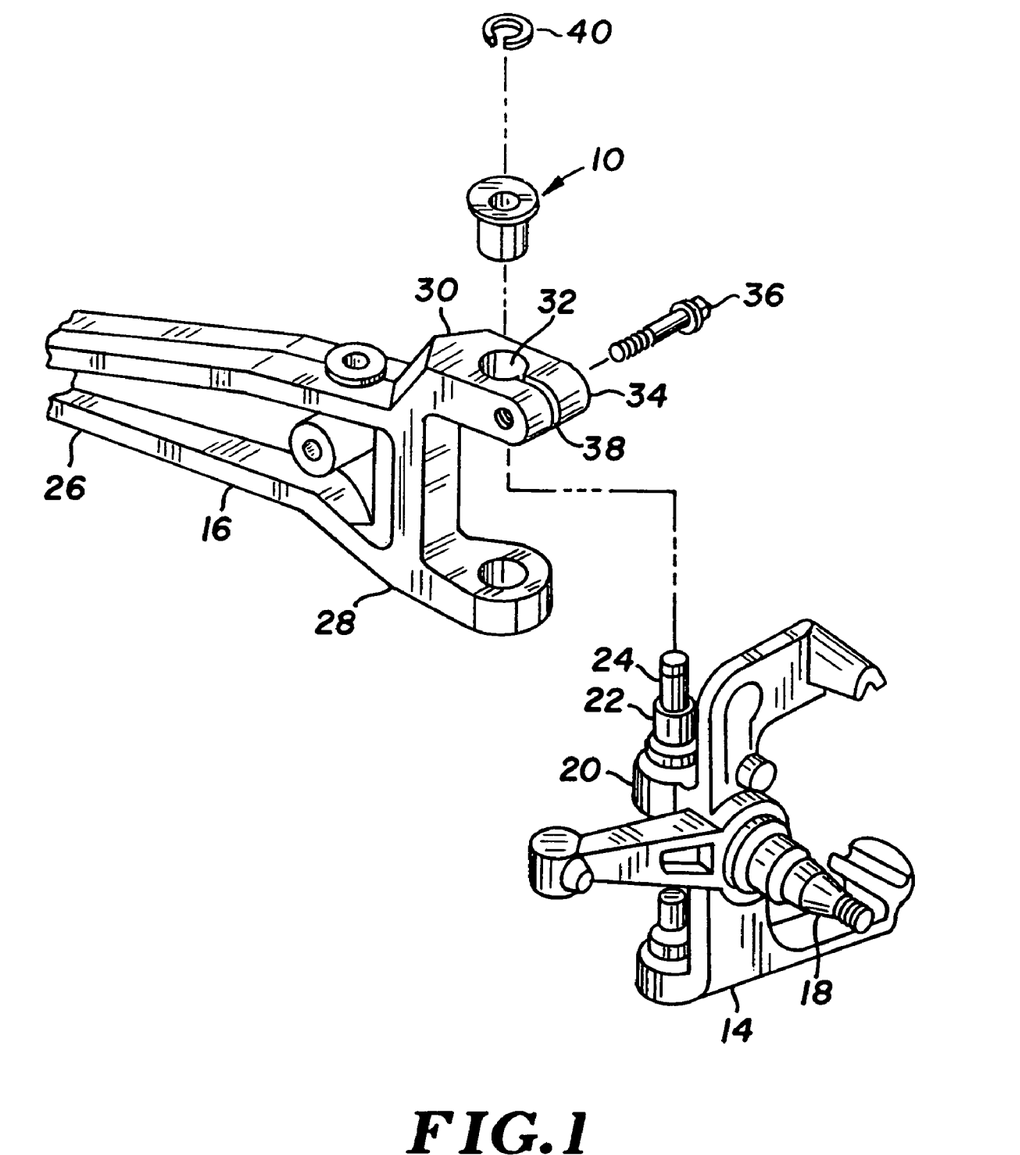
FIG. 1 shows an exploded perspective view of a portion of a suspension of a vehicle, including an axle arm, a spindle for engaging a wheel, and one embodiment of the present dual axis bushing assembly.
Figure 4:
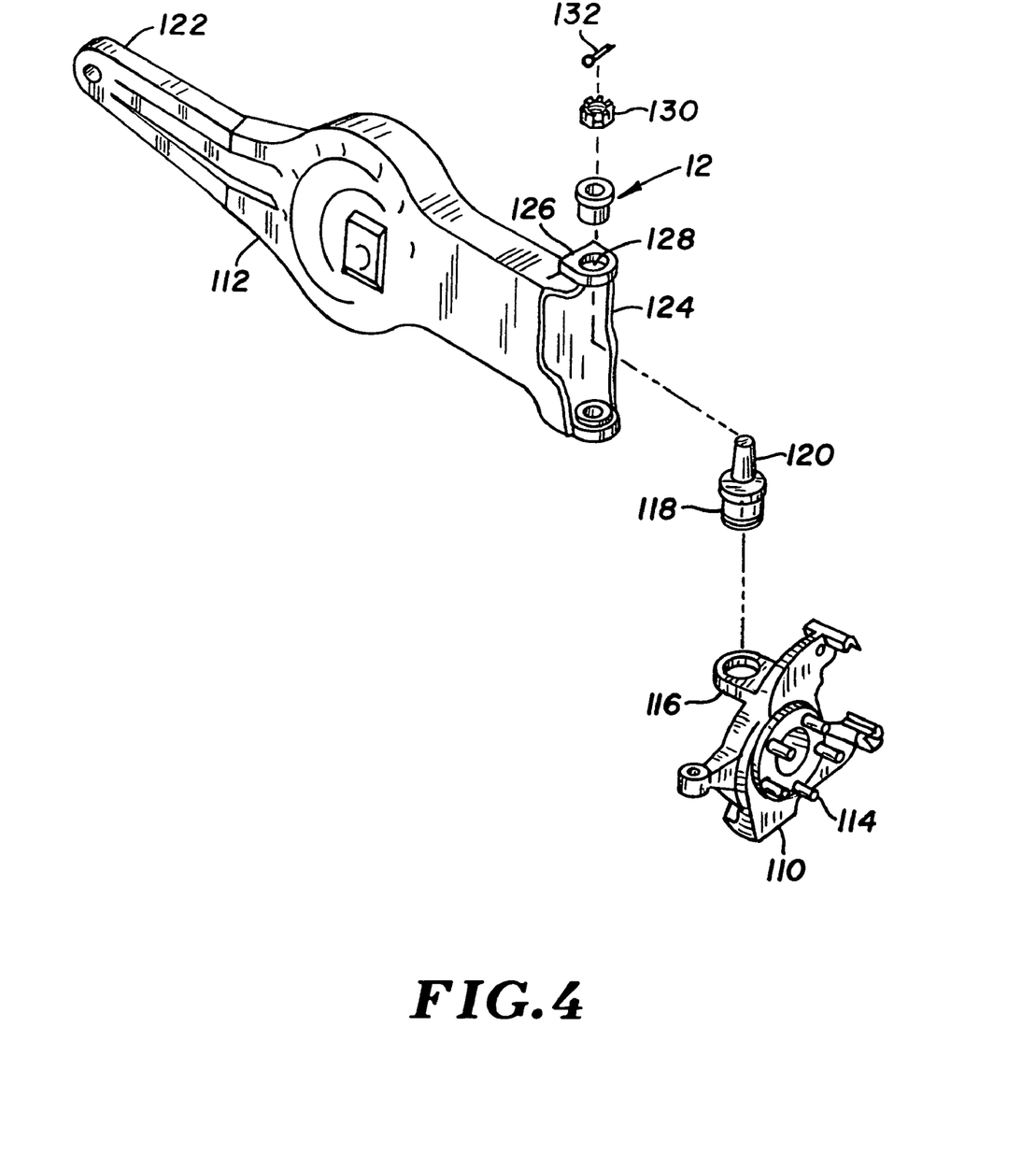
FIG. 4 shows an exploded perspective view of a portion of a suspension of a vehicle, including an axle arm, a spindle for engaging a wheel, and another embodiment of the present dual axis bushing assembly.

One dual axis bushing assembly of the present invention is shown in FIG. 1 and indicated by the reference numeral 10 and another dual axis bushing assembly of the present invention is shown in FIG. 4 and indicated by the reference numeral 12. Each of the assemblies 10, 12 includes an inner skewed bushing engaged in and rotatable in an outer skewed bushing.

As shown in FIG. 1, bushing assembly 10 provides a camber and caster connection between a spindle 14 and an axle arm 16. Spindle 14 includes an outward extension 18 upon which a wheel is mounted and an inward extension 20 for mounting an upper ball joint 22 having a stud 24 extending from the ball of the ball joint 22. Axle arm 16 includes an inner end portion 26 mounted to the frame of a vehicle and an outer end portion 28. Outer end portion 28 includes an upper control arm 30 having a cylindrical opening 32 that may be increased or decreased in diameter via a pinch clamp 34 tightened or loosened with a pinch bolt 36. Opposing end portions of the pinch clamp 34 confront each other at a generally linear location 38 that can be used during a camber and caster alignment operation. Bushing assembly 10 further includes a snap ring 40 that contributes to the engagement of assembly 10 between the spindle 14 and axle arm 16 and specifically engages a groove in the distal or upper or free end of the stud 24 of the upper ball joint 22 and, when so engaged, is also seated within the assembly 10.

FIGS. 2A, 2B, 2C, 2D, 3A, 3B, 3C, and 3D show assembly 10 in detail. Assembly 10 includes an outer skewed bushing 42, shown alone in FIG. 3A, and an inner skewed bushing 44, shown alone in FIG. 3B. Outer skewed bushing 42 generally includes an outer cylindrical surface portion 46, a head 48 and a through opening 50.

Figure 3A:
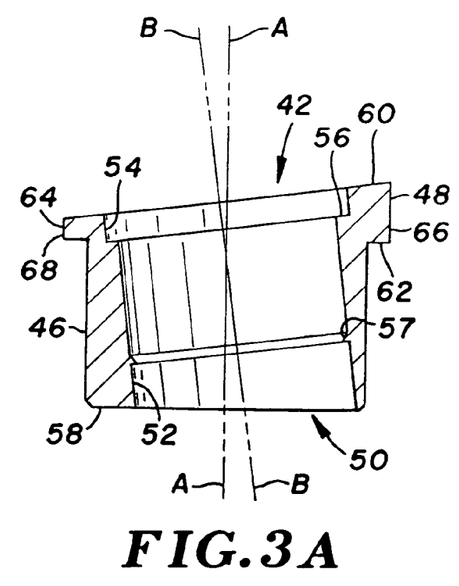
FIG. 3A is a section view of the outer skewed bushing of the embodiment of FIGS. 2A and 2B.

Outer cylindrical surface portion 46 has a central axis A. Through opening 50 is defined in part by an inner cylindrical surface portion 52, which has a central axis B. Through opening 50 is further defined in part by an inner cylindrical surface portion 54, which also has axis B as a central axis. Axis B is skewed relative to axis A such that through opening 50 is skewed relative to outer surface cylindrical portion 46.

Inner cylindrical surface portion 54 has a greater diameter than inner cylindrical surface portion 52 and, between such portions 52, 54, is formed an annular seat 56 for receiving a seat of the inner skewed bushing 44. Annular seat 56 lies in a plane that is 1) positioned at a right angle relative to axis B, 2) positioned obliquely relative to axis A, and 3) positioned obliquely relative to outer surface cylindrical portion 46.

Inner cylindrical surface portion 52 is broken by an annular retaining ridge or barb 57. Annular retaining ridge or barb 57 lies in a plane that is parallel to the plane in which annular seat 56 lies and hence barb 57 lies in a plane that is 1) positioned at a right angle relative to axis B, 2) positioned obliquely relative to axis A, and 3) positioned obliquely relative to outer surface cylindrical portion 46. Annular barb 57 is a lock that permits inner skewed bushing 44 to be slid into opening 50, over barb 57, and locked thereto, thereby minimizing chances for an unintended removal of inner skewed bushing 44 from outer skewed bushing 42.

Outer skewed bushing 42 includes a first or lower annular end or surface 58 and a second or upper annular end or surface or seat 60. Surface 58 lies in a plane disposed at a right angle relative to axis A. Surface 60 lies in a plane disposed at a right angle to axis B and hence lies in a plane that is parallel to annular seat 56 and annular barb 57. Surface 60 is an annular seat for receiving a seat of the inner skewed bushing 44.

Figure 2A:
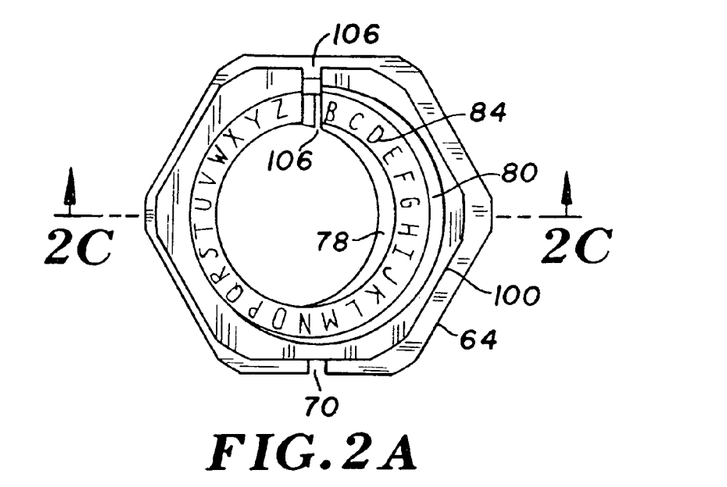
FIG. 2A shows a top view of dual axis bushing assembly of FIG. 1 in a neutral or zeroed position.

Head 48 of outer skewed bushing 42 has a width greater than a width of the outer surface cylindrical portion 46. Head 48 is defined in part by annular surface or seat 60. Head 48 is further defined in part by annular surface 62. Surface 62 lies in a plane that is positioned at a right angle to axis A and obliquely to axis B. Head 48 is further defined in part by polygonal surface 64 running between surfaces 60 and 62. Polygonal surface 64 is best shown in FIG. 2A. Polygonal surface 64 preferably is hexagonal for engagement by a tool such as a socket wrench such that the outer skewed bushing 42 can be turned or dialed relative to the inner skewed bushing 44. Head 48 is tapered. That is, annular surface 60 runs obliquely relative to axis A and annular surface 62 runs at a right angle relative to axis A such that head 48 includes a relatively thick portion 66 that diametrically opposes a relatively thin portion 68, where the relative thickness and thinness is defined as a distance running along axis A.

Figure 2B:
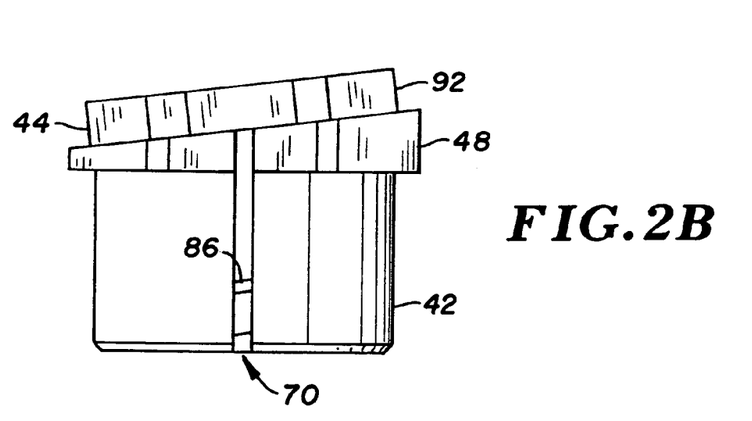
FIG. 2B shows a side view of the dual axis bushing assembly of FIG. 2A in a neutral or zeroed position.
Figure 2C:
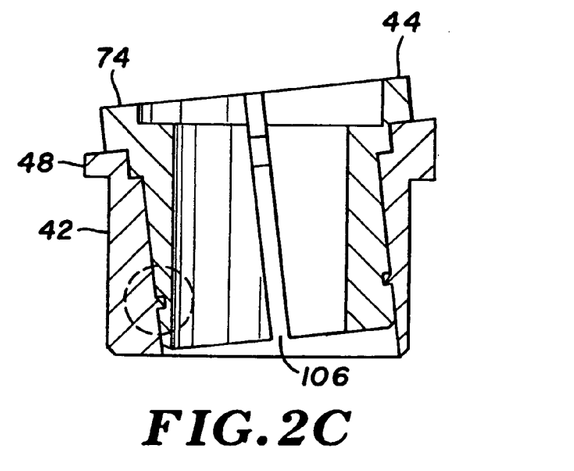
FIG. 2C shows a section view at lines 2C-2C of FIG. 2A.
Figure 2D:
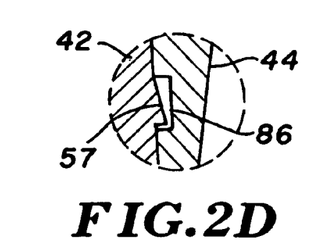
FIG. 2D is a detail view showing an annular retaining ridge and an annular retaining groove of the outer and inner bushings, respectively, relative to FIG. 2C.

Outer skew bushing 42 further includes a through slot 70 extending from outer cylindrical surface portion 46 to inner cylindrical surface portion 52, from polygonal surface 64 to inner cylindrical surface portion 54, and from annular end or surface 58 to annular end or surface 60. Slot 70 is parallel to axis A and is shown in FIGS. 2A and 2B. During a camber and caster alignment procedure or method, one alphabetical indicia of inner skewed bushing 44 is preferably aligned with slot 70 by rotating bushings 42, 44 relative to each other. Then bushing assembly 10 is rotated as a whole and at this time another alphabetical indicia (or perhaps the same alphabetical indicia or perhaps the slot 70) of inner skewed bushing 44 serves as an alignment or reference marking, such as relative to a marking on pinch clamp 34 or disposed adjacent to generally linear mark 38 shown in FIG. 1. Slot 70 further permits the outer skewed bushing 42 to be squeezed tightly against inner skewed bushing 44 when pinch bolt 36 draws the opposing portions or jaws of the pinch clamp 34 together.

Figure 3B:
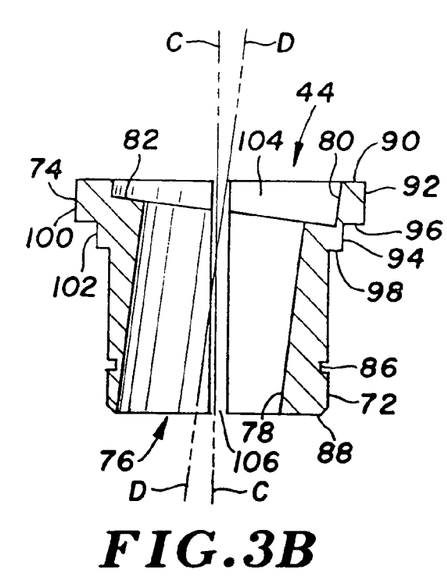
FIG. 3B is a section view of the inner skewed bushing of the embodiment of FIGS. 2A and 2B.

As shown in FIG. 3B, inner skewed bushing 44 includes an outer cylindrical surface portion 72, a head 74, and a through opening 76. Outer cylindrical surface portion 72 has a central axis C. Through opening 76 is defined in part by an inner cylindrical surface portion 78, which has a central axis D. Through opening 76 is further defined in part by an inner cylindrical surface portion 80, which also has axis D as a central axis. Axis D is skewed relative to axis C such that through opening 76 is skewed relative to outer surface cylindrical portion 72. Outer cylindrical surface portion 72 of inner skewed bushing 44 has a diameter equal to or slightly greater than the inner cylindrical surface portion 52 of outer skewed bushing 42 such that the inner skewed bushing 44 is engaged relatively tightly in the outer skewed bushing 42 so as to minimize, if not prevent, rotation by hand, and permit rotation only with the aid of leverage, such as leverage provided by a pair of wrenches, where one wrench engages bushing 42 and the other wrench engages bushing 44.

Inner cylindrical surface portion 80 has a greater diameter than inner cylindrical surface portion 78 and, between such portions 78, 80 is formed a connector seating annular surface 82 for receiving snap ring 40. Connector seating annular surface 82 lies in a plane that is 1) positioned at a right angle relative to axis D, 2) positioned obliquely relative to axis C, and 3) positioned obliquely relative to outer surface cylindrical portion 72. Indicia 84, namely alphabetical indicia, is formed in surface 82 for incrementally dialing inner skewed bushing 44 to the desired position relative to outer skewed bushing 42. Preferably, one alphabetical indicia 84 is rotatably aligned with slot 70 to provide the desired skew angle relative to outer cylindrical surface portion 46 of the outer skewed bushing 42. Then, bushing assembly 10 is preferably as a whole rotated to align another alphabetical indicia 84 (or perhaps the same alphabetical indicia or perhaps slot 70) with linear marking 38 (or another marking) to provide the desired skew angle relative to stud 24 and axle arm 16, thereby providing the desired camber and caster angles to the wheel. Then pinch bolt 36 is engaged and torqued. Then snap ring 40 is engaged to the ball stud 24 and, in such position, is preferably seated on the connector seating annular surface 82. In such a position, snap ring 40 covers indicia 84 and is shielded, via head 74, from rocks thrown into the suspension area by the wheel or from inadvertent or errant outside forces such as crowbars, jacks and other tools used on vehicles. Loss of the snap ring 40 leaves the pinch clamp 34 and pinch bolt 36 as the sole means of connection between the upper ball joint 22 and the upper control arm 30.

Outer cylindrical surface portion 72 includes an annular retaining groove 86 formed therein for engaging annular barb 57. Annular retaining groove 86 lies in a plane that is 1) positioned at a right angle relative to axis C, 2) positioned obliquely relative to axis D, and 3) positioned at a right angle relative to outer surface cylindrical portion 72. Annular barb 57 locks into groove 86 and permits inner skewed bushing 44 to be slid into opening 50 and over barb 57 whereupon, upon attempted removal of inner skewed bushing 44 from outer skewed bushing 42, the right angled wall of barb 57 confronts the lower right angled wall of groove 86.

Inner skewed bushing 44 includes a first or lower annular end or surface 88 and a second or upper annular end or surface 90. Surface 88 lies in a plane disposed at a right angle relative to axis C. Surface 88, when inner skewed bushing 44 is engaged to outer skewed bushing 42, lies within through opening 50 of outer skewed bushing 42 and does not extend beyond annular end 58 of outer skewed bushing 42. Annular surface 90 lies in a plane disposed at a right angle relative to axis C.

Head 74 of inner skewed bushing 44 includes a first or outer annular head portion 92 and a second or inner annular head portion 94. Outer annular head portion 92 has a width greater than a width of the inner annular head portion 94, which in turn has a width greater than outer surface cylindrical portion 72. Outer annular head portion 92 is defined in part by outer annular surface 90, and is further defined in part by an annular seat 96 that rides on annular surface or seat 60 of the head 48 of outer skewed bushing 42. Inner annular seat 94 is defined in part by an annular seat 98 that rides on annular seat 56 of the head 48 of the outer skewed bushing 42. Outer annular head portion 92 is further defined in part by a polygonal sidewall or surface 100, best shown in FIG. 2A. Polygonal surface 100 preferably is hexagonal for engagement by a tool such as a socket wrench such that the inner skewed bushing 44 can be turned or dialed relative to the outer skewed bushing 42. Inner annular seat 94 is further defined in part by an annular sidewall or surface 102 that includes a diameter equal to or slightly greater than the diameter provided by inner annular surface portion 54 of the outer skewed bushing 42. Head portions 92, 94 and corresponding surfaces 96, 94, 98 on inner skewed bushing 44 and head 48 and corresponding surfaces 54 and 56 provide a stepped engagement, or double seated engagement, between the outer and inner skewed bushings 42, 44. Such a stepped engagement minimizes entry of moisture and dirt to positions between the outer and inner skewed bushings 42, 44. Such a stepped engagement further permits head 74 to have a greater diameter for the tool turning polygonal sidewall 100 and still further permits the head 74 to have a greater height or thickness along axis D to provide more surface area on the polygonal sidewall 100 for confronting the tool or wrench engaging the polygonal sidewall 100.

Annular surface 96 lies in a plane that is positioned at a right angle to axis C. Annular surface 98 lies in a plane that is positioned at a right angle to axis C.

Connector seat receiving surface 82 lies in a plane positioned at a right angle relative to axis D. Connector seat receiving surface 82 and inner cylindrical surface portion 80 form a recess 104 for receiving snap ring 40. Recess 104, via head 74, provides a protected or shielded or safe area for the snap ring 40. In section, recess 104 is tapered in shape.

Inner skew bushing 44 further includes a through slot 106 extending from outer surfaces 72, 94 and 92 to inner surfaces 78 and 80 and further extending from annular end 88 to annular end 90 such that through slot 106 extends entirely through the wall of the inner skew bushing 44. Slot 106 is parallel to axis C and is shown in FIGS. 2A, 2C, 3B, and 3C. During a camber and caster alignment procedure or method, slot 106 is typically not used. Slot 106 permits the inner skewed bushing 44 to be squeezed tightly against the stud 24 of the upper ball joint 22 when pinch bolt 36 draws the opposing portions or jaws of the pinch clamp 34 together.

Figure 3C:
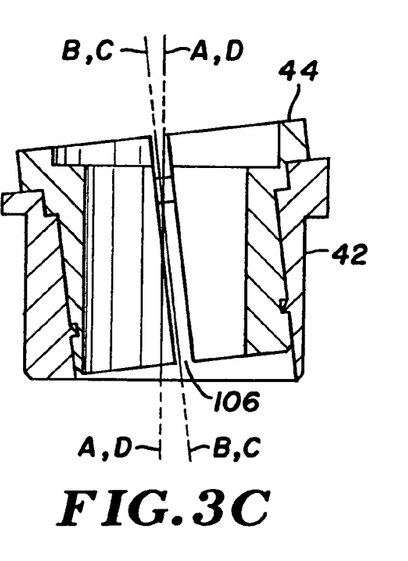
FIG. 3C is a section view of the inner and outer skewed bushings of FIGS. 3A and 3B rotated relative to each other to the neutral or zeroed position.

FIG. 3C shows that, when inner skewed bushing 44 is engaged in outer skewed bushing 42 and rotated to what is defined as a neutral or zeroed position, axis A and axis D are aligned. There is only one such neutral or zeroed position, and in such position axis A and axis D overlay each other as well as being aligned with one another. At such a position, bushing assembly 10 as a whole acts like a one-piece bushing having no skew and no eccentricity, where eccentricity is defined as a bushing having an axis located elsewhere than at the geometric center. In other words, at the neutral or zeroed position, axis D of through opening 76, which confronts the stud 24 of the upper ball joint 22, is a central axis relative to the outer cylindrical surface portion 46 of the outer skewed bushing 42, which is confronted by the jaws of the pinch clamp 34.

Figure 3D:
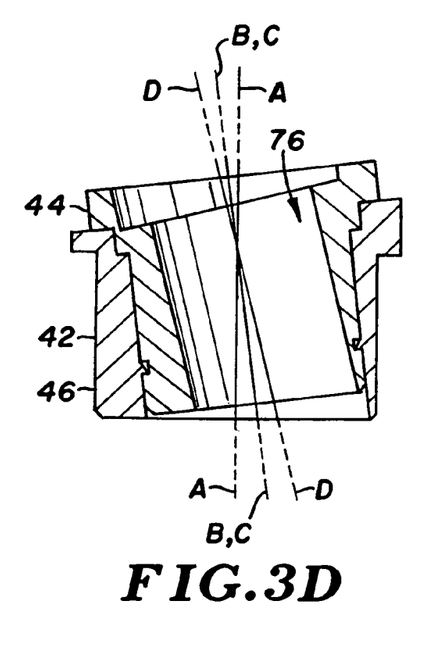
FIG. 3D is a section view of the inner and outer skewed bushings of FIGS. 3A and 3B rotated relative to each other to a maximum skewed setting having a maximum skew angle, in which setting the inner bushing has been rotated 180 degrees relative to the outer bushing shown in FIG. 3C.

FIGS. 3C and 3D shows that axis B is always aligned with and overlaid by axis C because axis B is the central axis of the through opening 50, which receives the outer cylindrical surface portion 72, which in turn has central axis C. From an operational standpoint, axis B and axis C are one and the same and may be referred to as axis BC.

FIG. 3D shows a maximum skew angle for through opening 76, which confronts the stud 24 of the upper ball joint 22, relative to the outer cylindrical surface portion 46, which is confronted by the jaws of the pinch clamp 34. In other words, central axis D of through opening 76 of inner skew bushing 44 is disposed at a maximum angle relative to central axis A of the outer cylindrical surface portion 46 of outer skew bushing 42. It should be noted that, at all rotative positions except the neutral or zeroed position, axis A, axis D and axis BC intersect at only one point. This single point is disposed within through opening 76 such that the single point is disposed within the bushing assembly 10 as a whole.

It should be noted that incremental and intermediate angles of skew are obtained by rotating the outer and inner skewed bushings 42, 44 to positions other than that shown in FIGS. 3C and 3D. After the desired angle of skew is obtained, whether such skew angle is that shown in FIG. 3C, is that shown in FIG. 3D, or is an intermediate scew angle therebetween, such a desired angle is further exploited by rotating the bushing assembly 10 as a whole in opening 32 of pinch clamp 34 to obtain the desired caster and camber angles.

Figure 9A:
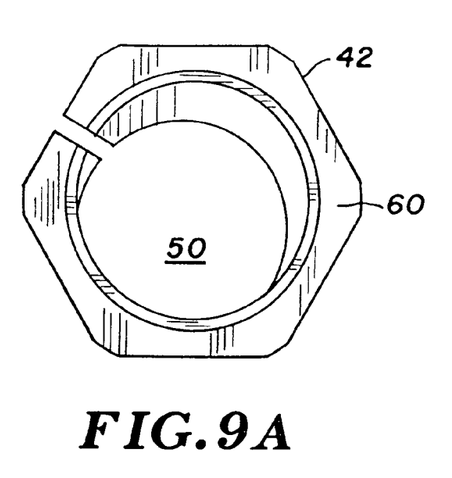
FIG. 9A shows a top view of the outer bushing of FIG. 3A.
Figure 9B:
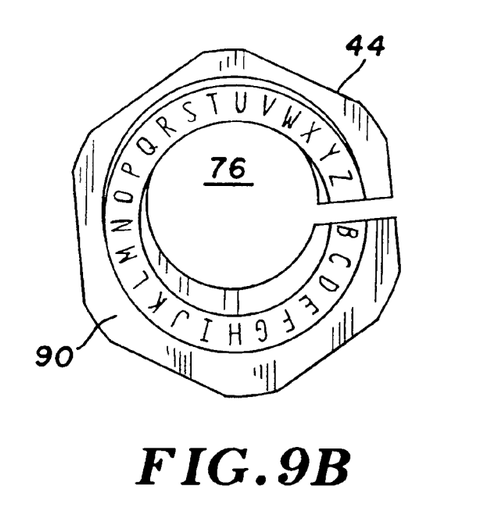
FIG. 9B shows a top view of the inner bushing of FIG. 3B.
Figure 10A:
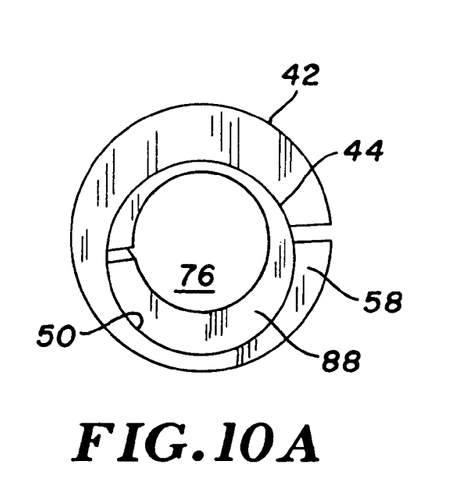
FIG. 10A shows a bottom view of the bushing assembly of FIG. 3C, illustrating the neutral position.

By comparing FIGS. 9A and 10A, it should be noted that through opening 50 is relatively greatly eccentric relative to end surface 58 and relatively minimally eccentric relative to end surface 60. By comparing FIGS. 9B and 10A, it should be noted that through opening 76 is relatively greatly eccentric relative to end surface 88 and is relatively minimally eccentric relative to end surface 90. Such minimal eccentricity is a further feature that permits a greater diameter and greater thickness to each of heads 48 and 74. Such minimal eccentricity can also be seen in section views 3A and 3B.

As shown in FIG. 4, bushing assembly 12 provides a camber and caster connection between a spindle 110 and an axle arm 112. Spindle 110 includes outward extensions 114 upon which a wheel is mounted and an inward extension 116 for mounting an upper ball joint 118 having a tapered, threaded and apertured stud 120 extending from the ball of the ball joint 118. Axle arm 112 includes an inner end portion 122 mounted to the frame of a vehicle and an outer end portion 124. Outer end portion 124 includes an upper control arm or portion 126 having a cylindrical opening 128 for receiving the bushing assembly 12. Bushing assembly 12 is engaged in opening 128 via a castle nut 130 threaded onto the threaded stud 120. A cotter pin 132 extends through an aperture in the stud 120 and further extends through slots of the caste nut 130 to minimize unintended turning, and hence ultimate disengagement, of castle nut 130.

Figure 5A:
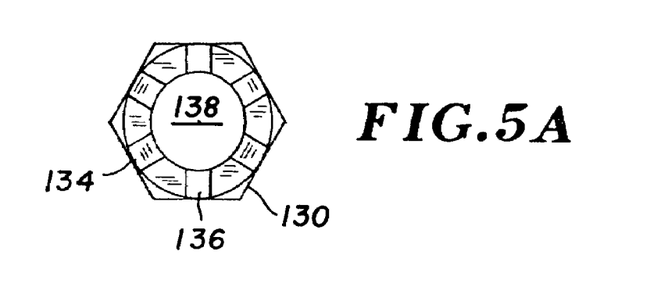
FIG. 5A is a top view of a modified castle nut for the dual axis bushing assembly of FIG. 4.
Figure 5B:
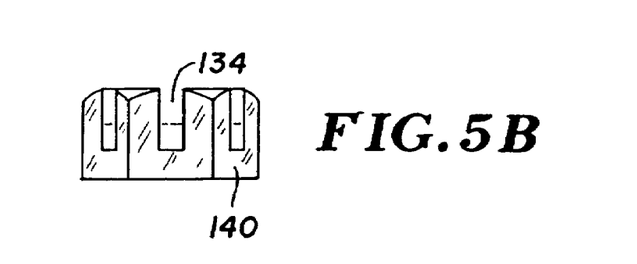
FIG. 5B is a side view of the modified castle nut of FIG. 5A.
Figure 5C:
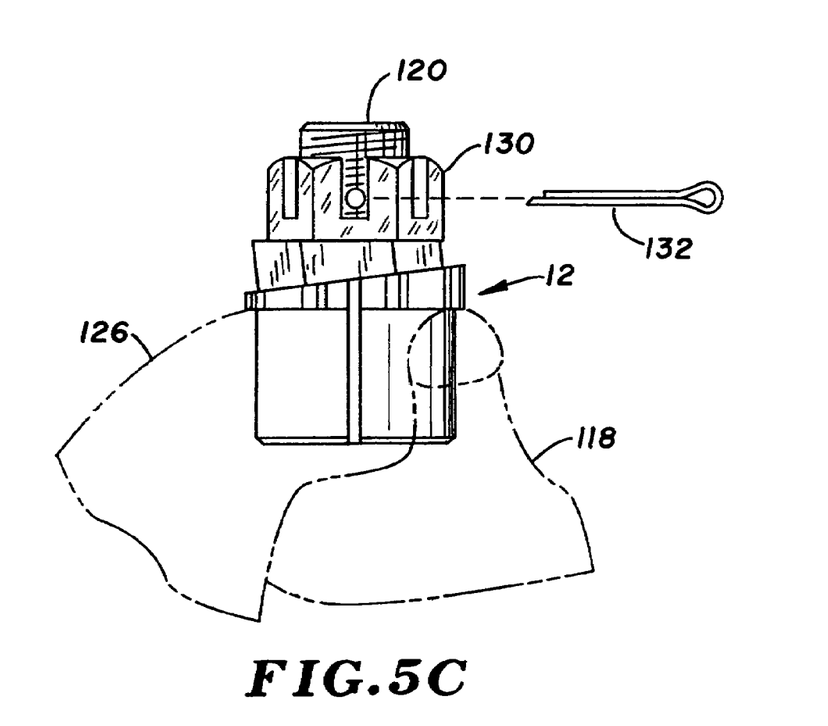
FIG. 5C is a side, partially phantom view of the dual axis bushing assembly of FIG. 4 engaged to the stud of the ball of the upper ball joint with the castle nut.

FIGS. 5A, 5B and 5C show the castle nut 130 in detail. Castle nut 130 is a unique castle nut 130 where the uniqueness is provided by the length of open ended slots 134, where each of the open ended slots includes a floor 136. In other words, each of slots 134 includes a length greater than one-half the height of the castle nut 130. The phantom lines shown in FIG. 5B show a conventional height for the floors of the slots of a conventional castle nut. Castle nut 130 includes an inner threaded opening 138 and an outer polygonal surface portion 140 for being manipulated by a wrench or other tool. With a lower floor 136, castle nut 130 can ride at a greater height on the stud 120, which in turn permits bushing assembly 12 as a whole to have a greater axial height and the head or head portions of the bushing assembly 12 to have a greater axial height (or thickness).

FIGS. 6A, 6B, 6C, 6D, 7A, 7B, 7C, and 7D show bushing assembly 12 in detail. Bushing assembly 12 includes an outer skewed bushing 142, shown alone in FIG. 7A, and an inner skewed bushing 144, shown alone in FIG. 7B. Outer skewed bushing 142 generally includes an outer cylindrical surface portion 146, a head 148 and a through opening 150.

Figures 7A, 7B, 7C, 7D:
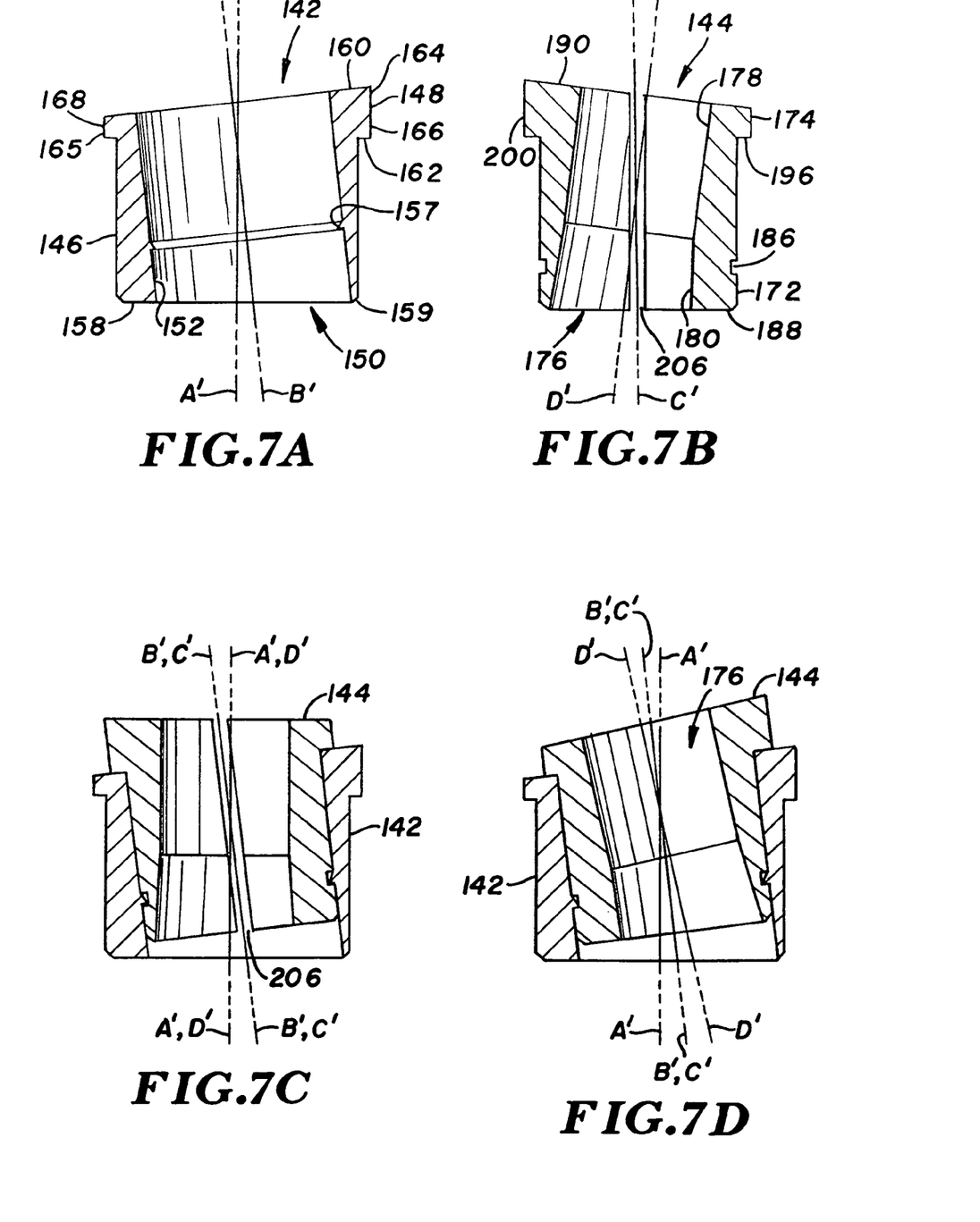
FIG. 7A is a section view of the outer skewed bushing of the embodiment of FIGS. 6A and 6B.
FIG. 7B is a section view of the inner skewed bushing of the embodiment of FIGS. 6A and 6B.
FIG. 7C is a section view of the inner and outer skewed bushings of FIGS. 7A and 7B rotated relative to each other to the neutral or zeroed position.
FIG. 7D is a section view of the inner and outer skewed bushings of FIGS. 7A and 7B rotated relative to each other to a maximum skewed setting having a maximum skew angle, in which setting the inner bushing has been rotated 180 degrees relative to the outer bushing shown in FIG. 7C.

Outer cylindrical surface portion 146 has a central axis A'. Through opening 150 is defined by an inner cylindrical surface portion 152, which has a central axis B'. Axis B' is skewed relative to axis A' such that through opening 150 is skewed relative to outer surface cylindrical portion 146.

Inner cylindrical surface portion 152 is broken by an annular retaining ridge or barb 157. Annular retaining ridge or barb 157 lies in a plane that is 1) positioned at a right angle relative to axis B', 2) positioned obliquely relative to axis A', and 3) positioned obliquely relative to outer surface cylindrical portion 146. Annular barb 157 is a lock that permits inner skewed bushing 144 to be slid into opening 150, over barb 157, and locked thereto, thereby minimizing chances for an unintended removal of inner skewed bushing 144 from outer skewed bushing 142.

Outer skewed bushing 142 includes a first or lower annular end or surface 158 and a second or upper annular end or surface or seat 160. Surface 158 generally lies in a plane disposed at a right angle relative to axis A'. One portion, identified by reference numeral 159, may be slightly recessed in the axial direction, to avoid the provision of an excessively thin wall section. Surface 160 lies in a plane disposed at a right angle to axis B' and hence lies in a plane that is parallel to barb 157. Surface 160 is an annular seat for receiving a seat of the inner skewed bushing 144.

Head 148 of outer skewed bushing 142 has a width, defined as the distance between outer ends of knuckles or ribs or ears or dogs 165, greater than a width of the outer surface cylindrical portion 146. Head 148 is defined in part by annular surface or seat 160. Head 148 is further defined in part by annular surfaces 162, which are the undersides of knuckles 165. Surfaces 162 lie in a plane that is positioned at a right angle to axis A' and obliquely to axis B'. Head 148 is further defined in part by surfaces 164 running between surfaces 160 and 162. Surfaces 164 are the outer sides of knuckles or extensions 165, best shown in FIG. 6A. Knuckles 165 can be engaged by a tool such that the outer skewed bushing 142 can be turned or dialed relative to the inner skewed bushing 144. Head 148 is further defined by a cylindrical surface portion 167 that extends between knuckles 165. Cylindrical surface portion 167 is effectively an extension of, or forms part of, outer cylindrical surface portion 146.

Head 148 is tapered. That is, annular surface 160 lies in a plane that runs obliquely relative to axis A' and annular surfaces 162 (the lower sides of the knuckles 165) lie in a plane that runs at a right angle relative to axis A' such that head 148 includes a relatively thick portion 166 having a relatively thick knuckle 165 that diametrically opposes a relatively thin portion 168 having a relatively thin knuckle 165, where the relative thickness and thinness is defined as a distance running along axis A'. Knuckles 165 too are tapered in a like manner.

Figure 6A:
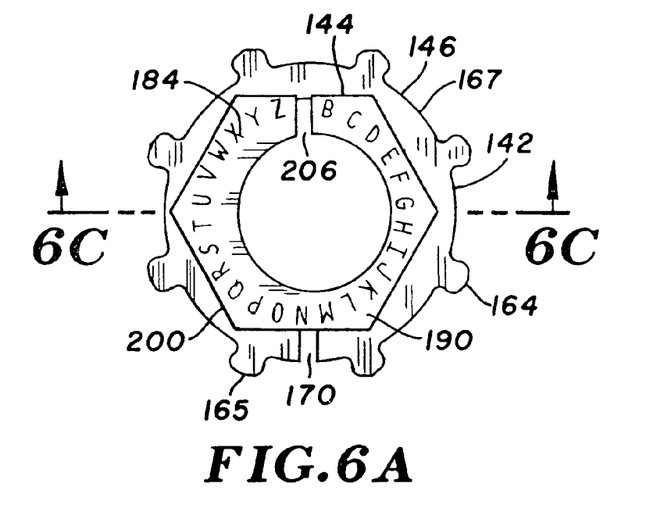
FIG. 6A shows a top view of dual axis bushing assembly of FIG. 4 in a neutral or zeroed position.
Figure 6B:
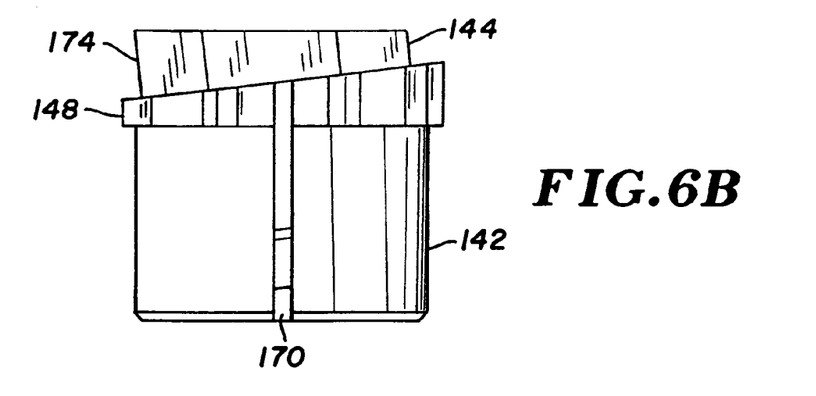
FIG. 6B shows a side view of the dual axis bushing assembly of FIG. 6A in a neutral or zeroed position.
Figure 6C:
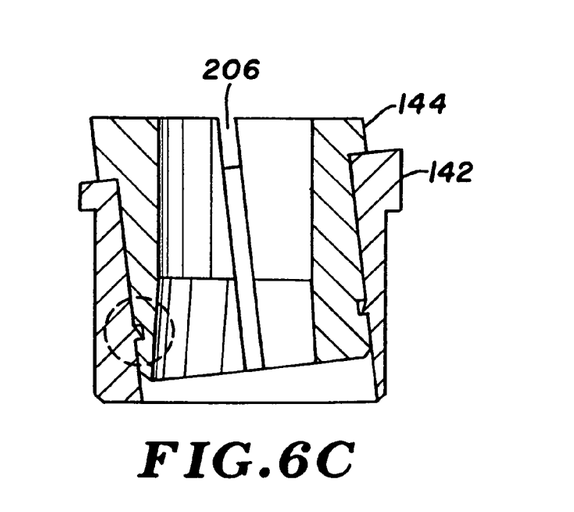
FIG. 6C shows a section view at lines 6C-6C of FIG. 6A.
Figure 6D:
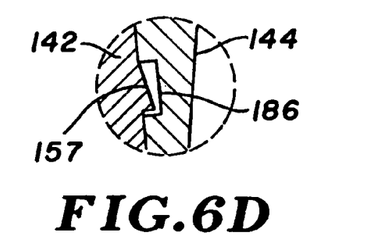
FIG. 6D is a detail view showing an annular retaining ridge and an annular retaining groove of the outer and inner bushings, respectively, relative to FIG. 6C.

Outer skew bushing 142 further includes a through slot 170 extending from outer cylindrical surface portion 146 to inner cylindrical surface portion 152 and further extending from annular end or surface 158 to annular end or surface 160. Slot 170 is parallel to axis A' and is shown in FIGS. 6A and 6B. During a camber and caster alignment procedure or method, inner bushing 144 is rotated relative to outer bushing 142 to align one alphabetical indicia of inner skewed bushing 144 with slot 170. Then bushing assembly 12 is rotated as a whole and at this time another alphabetical indicia (or perhaps the same alphabetical indicia or perhaps slot 170) serves as an alignment or reference marking, such as relative to a marking on the upper control arm 126 or at some other location such as a tab on the upper control arm 126.

As shown in FIG. 7B, inner skewed bushing 144 includes an outer cylindrical surface portion 172, a head 174, and a through opening 176. Outer cylindrical surface portion 172 has a central axis C'. Through opening 176 is defined in part by an inner cylindrical surface portion 178, which has a central axis D'. Through opening 176 is further defined in part by an inner tapered surface portion 180, which also has axis D' as a central axis. Tapered surface portion 180 confronts a tapered stud portion of stud 120. Axis D' is skewed relative to axis C' such that through opening 176 is skewed relative to outer surface cylindrical portion 172. Outer cylindrical surface portion 172 of inner skewed bushing 144 has a diameter equal to or slightly greater than the inner cylindrical surface portion 152 of outer skewed bushing 142 such that the inner skewed bushing 144 is engaged relatively tightly in the outer skewed bushing 142 so as to minimize, if not prevent, rotation by hand, and permit rotation only with the aid of leverage, such as leverage provided by a pair of wrenches.

Outer cylindrical surface portion 172 includes an annular retaining groove 186 formed therein for engaging annular barb 157. Annular retaining groove 186 lies in a plane that is 1) positioned at a right angle relative to axis C', 2) positioned obliquely relative to axis D', and 3) positioned at a right angle relative to outer surface cylindrical portion 172. Annular barb 157 locks into groove 186 and permits inner skewed bushing 144 to be slid into opening 150 and over barb 157 whereupon, upon attempted removal of inner skewed bushing 144 from outer skewed bushing 142, the right angled wall of barb 157 confronts the lower right angled wall of groove 186.

Inner skewed bushing 144 includes a first or lower annular end or surface 188 and a second or upper annular end or surface 190. Surface 188 lies in a plane disposed at a right angle relative to axis C'. Surface 188, when inner skewed bushing 144 is engaged in outer skewed bushing 142, lies within through opening 150 of outer skewed bushing 142 and does not extend beyond annular end 158 of outer skewed bushing 142. Annular surface 190 lies in a plane disposed at a right angle relative to axis D'.

Upper annular end or surface 190 is a connector seating annular surface for confronting the lower face (nonslotted face) of castle nut 130. Connector seating annular surface 190 lies in a plane that is 1) positioned at a right angle relative to axis D', 2) positioned obliquely relative to axis C', and 3) positioned obliquely relative to outer surface cylindrical portion 172. Indicia 184, namely alphabetical indicia, is formed in surface 190 for incrementally dialing inner skewed bushing 144 to the desired position relative to outer skewed bushing 142. Preferably, one alphabetical indicia is rotatably aligned with slot 170 to provide the desired skew angle relative to outer cylindrical surface portion 146 of the outer skewed bushing 142. Then, bushing assembly 12 is preferably as a whole rotated such that another indicia marking 184 (or slot 170) is aligned with a portion of upper control arm 126 such as a tab on upper control arm 126, thereby providing the desired skew angle relative to stud 120 and axle arm 112 and hence providing the desired camber and caster angles to the wheel on spindle 110. Then castle nut 130 is engaged to the ball stud 120 and tightened upon indicia containing surface 190. Then cotter pin 132 is inserted into the aperture of the ball stud 120 and one or more ends of the cotter pin are flared out to prevent an unintended turning and disengagement of the castle nut 130 from the stud 120.

Head 174 of inner skewed bushing 144 has a width greater than a width of outer surface cylindrical portion 172. Head 174 is defined in part by outer annular surface 190, and is further defined in part by an annular seat 196 that rides on annular surface or seat 160 of the head 148 of outer skewed bushing 142. Annular surface 196 lies in a plane that is positioned at a right angle to axis C'. Head 174 is further defined in part by a polygonal sidewall or surface 200, best shown in FIG. 6A. Polygonal surface 200 preferably is hexagonal for engagement by a tool such as a socket wrench such that the inner skewed bushing 144 can be turned or dialed relative to the outer skewed bushing 142.

Inner skew bushing 144 further includes a through slot 206 extending from outer surfaces 172, 200 to inner surfaces 178 and 180 and further extending from annular end 188 to annular end 190 such that through slot 206 extends entirely through the wall of the inner skew bushing 144. Slot 206 is parallel to axis C' and is shown in FIGS. 6A, 6C, 7B, and 7C. During a camber and caster alignment procedure or method, slot 206 is typically not used.

FIG. 7C shows that, when inner skewed bushing 144 is engaged in outer skewed bushing 142 and rotated to what is defined as a neutral or zeroed position, axis A' and axis D' are aligned. There is only one such neutral or zeroed position, and in such position axis A' and axis D' overlay each other as well as being aligned with one another. At such a position, bushing assembly 12 as a whole acts like a one-piece bushing having no skew and no eccentricity, where eccentricity is defined as a bushing having an axis located elsewhere than at the geometric center. In other words, at the neutral or zeroed position, axis D' of through opening 176, which confronts the stud 120 of the upper ball joint 118, is a central axis relative to the outer cylindrical surface portion 146 of the outer skewed bushing 142, which is confronted by the cylindrical walls of opening 128 of axle arm 112.

FIGS. 7C and 7D shows that axis B' is always aligned with and overlaid by axis C' because axis B' is the central axis of the through opening 150, which receives the outer cylindrical surface portion 172, which in turn has central axis C'. From an operational standpoint, axis B' and axis C' are one and the same and may be referred to as axis B'C'.

FIG. 7D shows a maximum skew angle for through opening 176, which confronts the stud 120 of the upper ball joint 118, relative to the outer cylindrical surface portion 146, which is confronted by the cylindrical walls of opening 128 in axle arm 112. In other words, central axis D' of through opening 176 of inner skew bushing 144 is disposed at a maximum angle relative to central axis A' of the outer cylindrical surface portion 146 of outer skew bushing 142. It should be noted that, at all rotative positions except the neutral or zeroed position, axis A', axis D' and axis B'C' intersect at only one point. This single point is disposed within through opening 176 such that the single point is disposed within the bushing assembly 12 as a whole.

It should be noted that incremental and intermediate angles of skew are obtained by rotating the outer and inner skewed bushings 142, 144 to positions other than that shown in FIGS. 7C and 7D. After the desired angle of skew is obtained, whether such skew angle is that shown in FIG. 7C, is that shown in FIG. 7D, or is an intermediate skew angle therebetween, such a desired angle is further exploited by rotating the bushing assembly 12 as a whole in opening 128 of axle arm 112 to obtain the desired caster and camber angles.

Figure 9C:
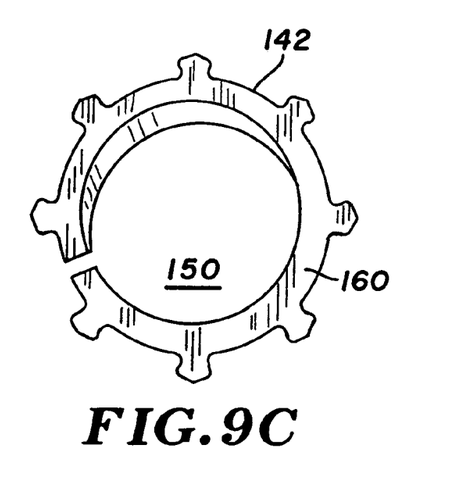
FIG. 9C shows a top view of the outer bushing of FIG. 7A.
Figure 9D:
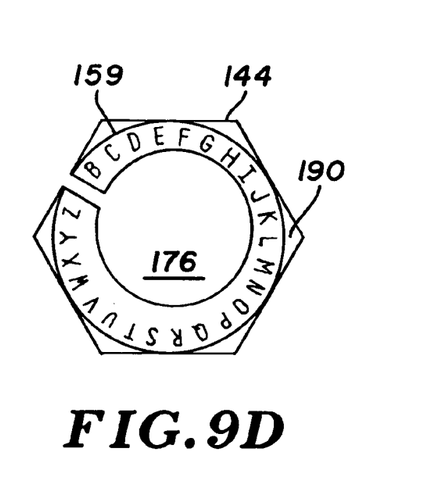
FIG. 9D shows a top view of the inner bushing of FIG. 7B.
Figure 10B:
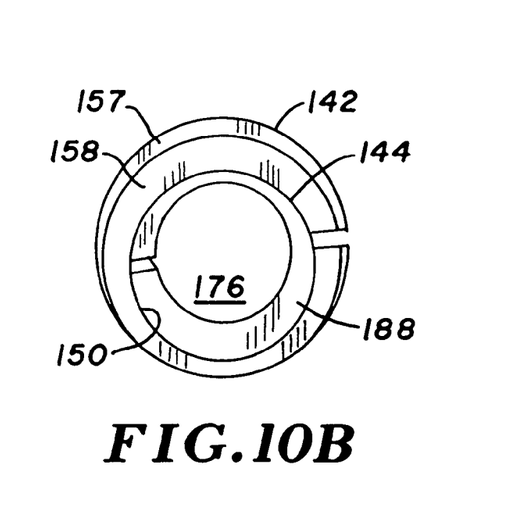
FIG. 10B shows a bottom view of the bushing assembly of FIG. 7C, illustrating the neutral position.
Figure 10C:
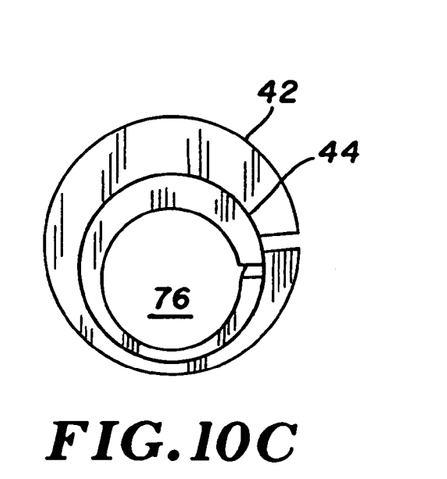
FIG. 10C shows a bottom view of the bushing assembly of FIG. 3D, illustrating the maximum skewed position.
Figure 10D:
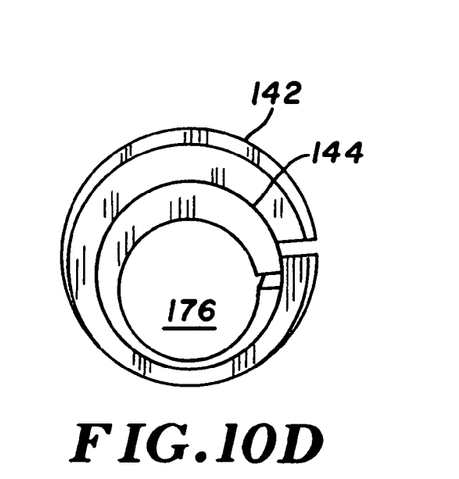
FIG. 10D shows a bottom view of the bushing assembly of FIG. 7D, illustrating the maximum skewed position.

By comparing FIGS. 9C and 10B, it should be noted that through opening 150 is relatively greatly eccentric relative to end surface 158 and relatively minimally eccentric relative to end surface 160. By comparing FIGS. 9D and 10B, it should be noted that through opening 176 is relatively greatly eccentric relative to end surface 188 and is relatively minimally eccentric relative to end surface 190. Such minimal eccentricity is a further feature that permits a greater diameter and greater thickness to each of heads 148 and 174. Such minimal eccentricity can also be seen in section views 7A and 7B. Surface 157 in FIG. 10B is a chamfered surface. The ring 159 in FIG. 9D is merely a marking formed in surface 190 about the alphabetical indicia.

It should be noted that each of heads 148 and 174 is tapered. That is, annular surfaces 160 and 162 are oblique relative to each other on outer skewed bushing 142 and annular surfaces 190 and 196 are oblique relative to each other on inner skewed bushing 144. When rotated to the neutral or zeroed position shown in FIG. 7C, the tapered heads 148, 174 compensate for each other. When rotated to the maximum skew angle, as shown in FIG. 7D, the tapered heads 148, 174 are additive. Such a feature permits the heads 148 and 174 to have a relatively greater diameter, and a relatively greater height (or thickness along the axis A', B'C', and D').

Figure 8A:
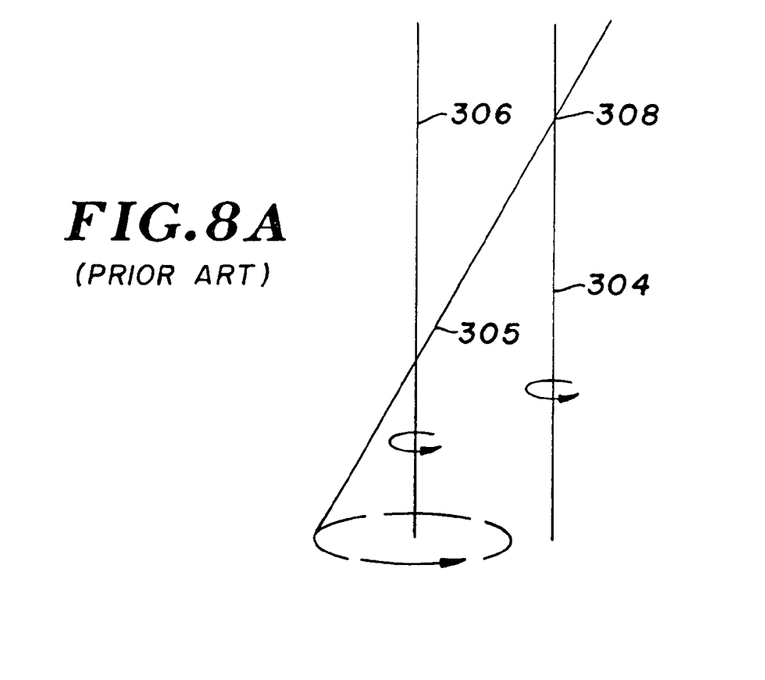
FIG. 8A is a diagrammatic view of a prior art unfocused bushing assembly.

FIG. 8A shows the prior art bushing of the Ingalls et al. U.S. Pat. No. 4,420,272 issued Dec. 13, 1983 and entitled Method And Structure For Bearing The Eccentricity Of A Bushing Bore, which is hereby incorporated by reference in its entirety. Such bushing can be referred to as an unfocused bushing. That is, unfocused bushings have two vertical centerlines, and a third vertical, or angled, rotational centerline. One vertical centerline 304 defines the rotational centerline of the larger eccentric, and one vertical centerline 306 defines the rotational centerline of the smaller inner eccentric. The two vertical centerlines 304, 306 are parallel to each other and do not intersect. A third centerline 305 located through the smaller inner eccentric is either vertical and parallel, or angled and not parallel, relative to the parallel vertical centerlines 304, 306 of both the inner and outer eccentrics. If angled and not parallel the rotational centerline 305 within the smaller eccentric may, or may not, depending on its orientation, intersect continuously with the vertical centerline 306 of the smaller inner eccentric. Regardless of its orientation within the smaller inner eccentric, the angled centerline 305 can at best only briefly intersect with the rotational centerline 304 of the larger eccentric 304 at only one specific rotational position 308 during its rotation. If parallel, the third centerline 305 within the smaller eccentric never intersects with either the larger outer, or the smaller inner, eccentric centerlines. Since the centerline 306 of the inner eccentric does not pass through point 308, and since the centerline 305 does not remain fixed at point 308 during its rotation around centerline 306, an unfocused bushing does not automatically rotate to allow a zero offset bushing to be created. Not being able to automatically create a zero offset bushing forces the alignment mechanic to install and then remove a separate zero offset bushing to accurately determine a starting point in order for an accurate wheel alignment correction to be made. This doubles the amount of labor cost to the public for this particular step of wheel alignment.

Figure 8B:
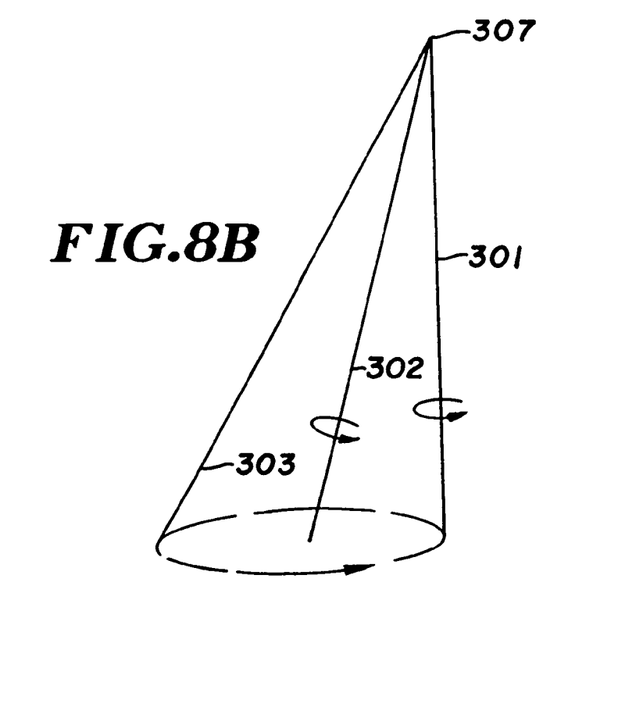
FIG. 8B is a diagrammatic view of the present single point focused bushing assembly (either the embodiment of FIG. 1 or the embodiment of FIG. 4).

Present bushing assemblies 10 and 12 are each a single point focused bushing and each is represented diagramatically in FIG. 8B. Single point focused skewed bushings have three rotational centerlines that are not parallel to each other. All three centerlines intersect each other at all times at a single unchanging point 307. One vertical centerline 301 defines the rotational centerline of the outer bushing 42 or 142. A second centerline 302 defines the rotational centerline of the inner bushing 44 or 144 and is angled in such a way relative to the vertical centerline 301 so as to intersect the centerline 301 at a single fixed point 307 during individual or simultaneous rotation of either the inner or outer bushings along their centerlines. This second centerline 302 defines the rotational centerline of the inner bushing. Within the inner bushing, a third rotational centerline 303 rotates around centerline 302 and is angled relative to the centerline 302 of the inner bushing in such a way as to continuously intersect the vertical centerlines 301 of the outer bushing at exactly the same point 307 as the centerline 302 of the inner bushing. All three centerlines intersect continuously at the single point 307 during all possible combinations of individual or simultaneous rotation. This continuous intersection of all three rotational centerlines at a single point 307 allows larger mechanical offsets to be created to more greatly effect wheel alignment change within the same physical space taken up by an alignment bushing that does not have centerlines that continuously intersect at a single point. The single rotational center point 307 also guarantees that centerline 303 at one point during its rotation around centerline 302 exactly overlays the centerline 301 of the outer bushing. This overlay creates a zero offset bushing assembly as a whole. In this way, a wheel alignment bushing is created that includes all wheel alignment possibilities between zero offset and maximum offset. Creation of a zero offset bushing allows the alignment mechanic to avoid wasting time installing, and then removing, a separate zero offset bushing into the vehicle to determine an accurate starting point for an appropriate wheel alignment correction.

In FIG. 8B, the closer the three centerlines come to intersecting with each other at a single point 307, the greater the bushings offset potential and ability to accurately create a zero offset bushing.

It should be noted that a three centerline bushing with all three centerlines parallel to each other (no intersection of any of the three centerlines) has the smallest potential offset.

It should be noted that a three centerline bushing with two of the three centerlines intersecting each other (no matter how briefly) has a larger offset potential.

It should be noted that a three centerline bushing with all three centerlines intersecting each other continuously through the single point 307 has the most offset potential for any given bushing diameter.

In FIG. 8B, it should be noted that centerline 301 is representative of axis A or A', that centerline 302 is representative of axis BC or axis B'C', and that centerline 303 is representative of axis D or D'. Single point 307 is contained within bushing assemblies 10, 12.

Bushing assembly 10 or bushing assembly 12 can be used as follows in the following alignment operation:

1) Take an initial alignment reading to determine whether the vehicle is out of OEM specifications;

2) Remove the tire/wheel assembly and the currently installed bushing from the upper ball joint;

3) Install bushing assembly 10 or 12 in the neutral or zero degree position by dialing the "N" alphabetical indicia of the inner bushing to the slot of the outer bushing. It does not matter at this point in what position the bushing assembly 10 or 12 as a whole is installed because the bushing assembly as a whole is at the neutral or zeroed position;

4) Take a new alignment reading to determine the amount of positive or negative camber and caster changes that are necessary;

5) Refer to a proper chart for the vehicle model that is being serviced;

6) The chart can indicate to what degree the inner bushing should be dialed relative to the outer bushing. For example, the chart can indicate that the inner and outer bushings should be relatively dialed until a certain letter of the inner bushing is adjacent the slot of the outer bushing.

7) It is not necessary to remove the bushing assembly 10 or 12 from the upper ball joint stud to index the inner bushing properly relative to the outer bushing.

8) The chart can further indicate to what degree the bushing assembly as a whole should be rotated relative to the ball joint stud. For example, the chart can indicate that the bushing assembly as a whole should be dialed (rotated) until a certain letter is adjacent to a marking on the axle arm or ball joint stud or other location on the vehicle.

9) Install the pinch bolt or castle nut and torque to the manufacturer's specifications. Then install the snap ring or cotter pin.

10) Proceed with alignment and road test the vehicle.

It should be noted that indicia 84 and 184 can be formed in other annular or generally circular locations on the inner skewed bushings 44, 144 as, for example, annular surface 90 and polygonal surfaces 100, 200. Further, if desired, such alphabetical indicia may be formed on the outer skewed bushings 42, 142 and where such alphabetical indicia are rotatably alignable with a marking such as slot 106, 206 on the inner bushing 42, 142.

It should be noted that, with the present dual axis bushing assembly 10 or 12, a skew or throw improvement over prior art bushings of about 25% is achieved with the orientations shown in FIGS. 3D and 7D. Further, prior art bushings do not dial in true zero. For example, bushing 10 can have a camber and caster adjustment range of zero degrees to plus or minus 4.0 degrees. Bushing 12 can have a camber and caster adjustment range of zero degrees to plus or minus 3.2 degrees.

It should be noted that bushings 10, 12 can be machined from steel or produced from a powdered metal and molded or produced from a powdered metal and molded and then machined.

It should be noted that slots 70, 106, 170, 206 provide a degree of flexibility to the bushing assemblies 10, 12.

What is claimed is:

1. A dual axis bushing assembly, comprising:
   (a) an outer bushing comprising:
      (i) an outer surface portion A, wherein the outer surface portion A includes a central axis A;
      (ii) an inner through opening B, wherein the inner through opening B includes a central axis B; and
      (iii) wherein central axis A and central axis B intersect at one point such that inner through opening B is skewed relative to the outer surface portion A;
   (b) an inner bushing comprising:
      (i) an outer surface portion C, wherein the outer surface portion C includes a central axis C;
      (ii) an inner through opening D, wherein the inner through opening D includes a central axis D; and
      (iii) wherein central axis C and central axis D intersect at one point such that inner through opening D is skewed relative to the outer surface portion C;
   (c) wherein the inner bushing is engageable and rotatable in the outer bushing; and
   (d) wherein the inner bushing includes a head comprising an annular recess, with said annular recess running about the inner through opening D, being shielded from an exterior environment of the dual axis bushing assembly via the head of the inner bushing, and being adaptable for receiving a snap ring therein whereby effects of said exterior environment upon said snap ring are minimized and whereby a head of a relatively greater height can be provided.

2. The dual axis bushing assembly of claim 1, wherein the outer bushing comprises an inner annular seat and an outer annular seat, wherein the inner bushing comprises an inner annular seat for engaging the inner annular seat of the outer bushing, wherein the inner bushing further comprises an outer annular seat for engaging the outer annular seat of the outer bushing whereby a stepped engagement is provided between the outer bushing and inner bushing to minimize entry of dirt and moisture therebetween and whereby a head of a relatively greater height can be provided to the inner bushing.

3. The dual axis bushing assembly of claim 1, wherein each of the outer bushing and inner bushing includes a head, wherein one of the heads includes an outer side surface that is polygonal.

4. The dual axis bushing assembly of claim 1, wherein each of the outer bushing and inner bushing includes a head, wherein each of the heads includes an outer side surface that is polygonal.

5. The dual axis bushing assembly of claim 1, wherein the outer bushing includes a first annular end surface, and with the first annular end surface being oblique relative to the outer surface portion A.

* * * * *